(12) United States Patent
Hong et al.

(10) Patent No.: US 9,635,115 B2
(45) Date of Patent: Apr. 25, 2017

(54) UNUSED LOCATION DISCRIMINATOR

(71) Applicant: International Business Machines Corporation, Armonk, NY (US)

(72) Inventors: Justin Kai-Yuen Hong, Austin, TX (US); Hari Haranath Madduri, Austin, TX (US); Michael Edward Ortman, Austin, TX (US); Neda Samani, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 14/201,289

(22) Filed: Mar. 7, 2014

(65) Prior Publication Data

US 2015/0256630 A1 Sep. 10, 2015

(51) Int. Cl.
*H04L 29/08* (2006.01)
*G06F 3/0482* (2013.01)
(Continued)

(52) U.S. Cl.
CPC ............ *H04L 67/18* (2013.01); *G06F 3/0482* (2013.01); *G06F 3/04842* (2013.01);
(Continued)

(58) Field of Classification Search
CPC .... G01C 21/3685; G08G 1/143; G08G 1/144; G08G 1/147; G08G 1/0129;
(Continued)

(56) References Cited

U.S. PATENT DOCUMENTS 7,868,784 B2 1/2011 Kuo et al.
8,306,734 B2 11/2012 Mathews
(Continued)

FOREIGN PATENT DOCUMENTS

WO WO2009154599 A1 12/2009

OTHER PUBLICATIONS

Jin Teong Ang, iScaps-Innovative Smart Car Park System integrated with NFC technology and e-Valet function, Georgetown, Penang, Malaysia.
(Continued)

*Primary Examiner* — Amy Ng
*Assistant Examiner* — Sang H Kim
(74) *Attorney, Agent, or Firm* — David Zwick; Robert C. Rolnik

(57) ABSTRACT

Instrumentalities are effective to at least provide a user interface to a mobile device of the user for finding an unused space, among a plurality of spaces, according to a user-selected criteria, wherein the user interface is transmitted via a wireless protocol agreed during the wireless handshake; and in response, presenting the mobile device with first unused spaces meeting the user-selected criteria. Further, an access point may receive a problem space indication from the user concerning at least one of the unused spaces which associates a problem to the at least one of the unused spaces, thereby forming a problem space, and in response, second presenting a second at least one unused space to the mobile device without the problem space, wherein the second unused spaces are presented in order of nearness to a current user location.

17 Claims, 5 Drawing Sheets

(51) Int. Cl.
*G06F 3/0484* (2013.01)
*H04W 4/02* (2009.01)
*H04W 4/04* (2009.01)

(52) U.S. Cl.
CPC .............. *H04L 67/02* (2013.01); *H04L 67/10* (2013.01); *H04L 67/36* (2013.01); *H04W 4/021* (2013.01); *H04W 4/046* (2013.01)

(58) Field of Classification Search
CPC .. G08G 1/0141; G08G 1/096838; G08G 1/14; G08G 1/0112; G08G 1/0116; G08G 1/017; G08G 1/096791; G08G 1/096827; G08G 1/096844; G08G 1/146; G07B 15/02; G06Q 30/0284; G06F 17/3087
See application file for complete search history.

(56) References Cited

U.S. PATENT DOCUMENTS

| | | | |
|---|---|---|---|
| 8,423,275 | B1 | 4/2013 | Kandal |
| 2008/0048885 | A1 | 2/2008 | Quinn |
| 2012/0056758 | A1* | 3/2012 | Kuhlman .................. G08G 1/14 340/932.2 |
| 2012/0265434 | A1 | 10/2012 | Woodard et al. |
| 2013/0141252 | A1 | 6/2013 | Ricci |
| 2013/0265174 | A1 | 10/2013 | Scofield et al. |
| 2013/0326407 | A1* | 12/2013 | van Os .................. G01C 21/00 715/810 |
| 2013/0332060 | A1* | 12/2013 | Chowdhary ............ G06F 17/00 701/300 |
| 2014/0122190 | A1* | 5/2014 | Wolfson ............. G06Q 10/0631 705/13 |
| 2014/0225763 | A1* | 8/2014 | Kavaler ................. G08G 1/142 342/70 |
| 2014/0372185 | A1* | 12/2014 | Ganot .................... G07B 15/02 705/13 |
| 2015/0066545 | A1* | 3/2015 | Kotecha ................. G06Q 10/02 705/5 |

OTHER PUBLICATIONS

Dusan Teodorovic, Intelligent parking systems, ScienceDirect, www.sciencedirect.com. Apr. 9, 2005.

* cited by examiner

| 301 Space Label | 302 Unused? | 303 Problem? | 304 Large? | 305 Close to Elevator? | 307 Above Ground? | 308 Roof Covers? | 309 Location/distance information |
|---|---|---|---|---|---|---|---|
| C31 | Y | Debris in space | N | N | Y | Y | Level C, Row 1, space 31 |
| C35 | N | N | N | N | Y | Y | Level C, Row 1, Space 35 |
| C61 | Y | N | N | Y | Y | Y | Level C, Row 3, Space 61 |
| A10 | Y | N | N | N | N | Y | Level A, Row 3, Space 10 |

UNUSED LOCATION DISCRIMINATOR

BACKGROUND

The present invention relates to a computer implemented method, data processing system, and computer program product for obtaining location information concerning unused spaces and more specifically to reporting location data as updated from at least sensors that monitor spaces.

Within the field of computing, route navigation may comprise receiving a destination and providing navigation instructions (e.g., turn by turn directions) thereto. For example, an application may provide directions to a destination based upon a location of a traveler (e. g., a current location for the traveler). Such an application may, for example, execute on a location-aware device. A location aware device may also have access to mapping information and be capable of providing routing information, for example. Devices such as this may also generate traffic information (e.g., speeds of vehicles traveling along a particular span of roadway, estimated time until arrival at a destination) or infer traffic conditions, for example.

Some previous attempts to match a driver to a parking spot or space simply solved the problem of moving from point 'A' to a particular spot 'B' along the earth's surface. However, such spaces tend to be widely dispersed, when considering street parking. In addition, no option is present to take user preferences other than location into account.

SUMMARY

According to one embodiment of the present invention a method, computer program product and system is provide which is effective to at least provide a user interface to a mobile device of the user for finding an unused space, among a plurality of spaces, according to a user-selected criteria, wherein the user interface is transmitted via a wireless protocol agreed during the wireless handshake; and in response, presenting the mobile device with first unused spaces meeting the user-selected criteria. Further, an access point may receive a problem space indication from the user concerning at least one of the unused spaces which associates a problem to the at least one of the unused spaces, thereby forming a problem space, and in response, second presenting a second at least one unused space to the mobile device without the problem space, wherein the second unused spaces are presented in order of nearness to a current user location.

DETAILED DESCRIPTION

Figure 1:
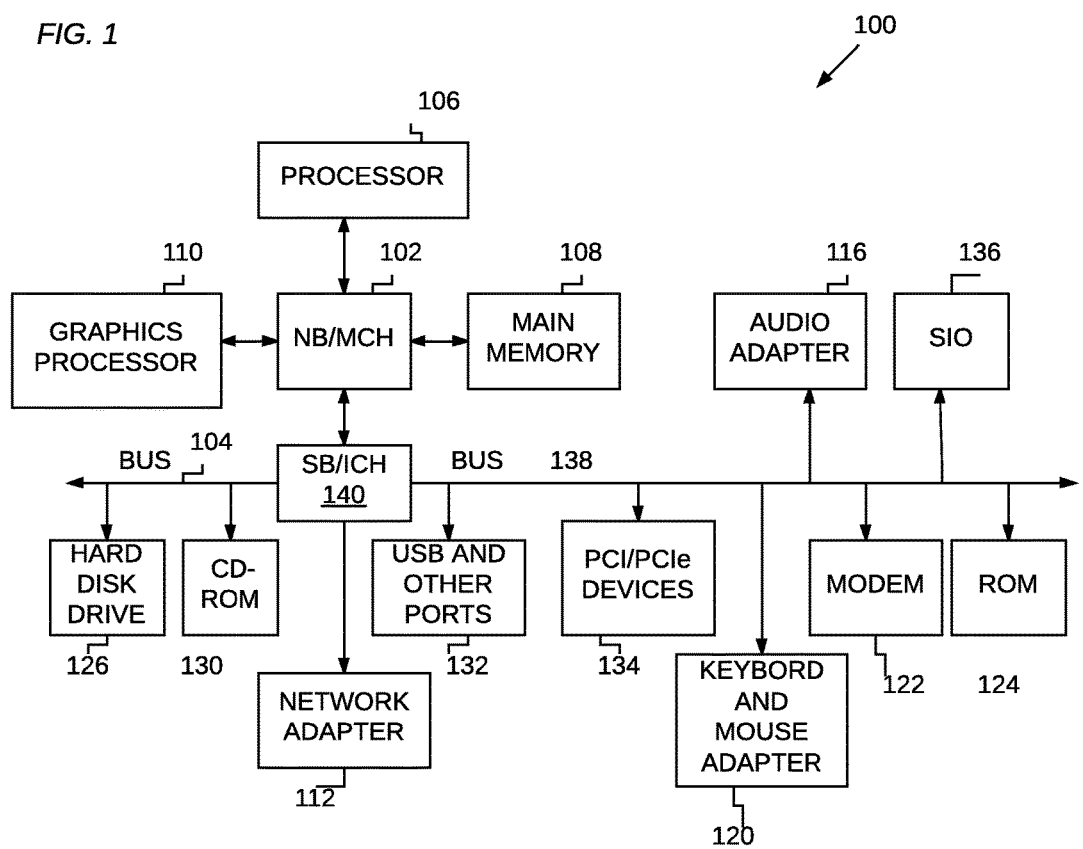
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the embodiments can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

An unused location is a space that is largely empty of a vehicle and/or people, at least to the extent that may be detected using a sensor directed at the unused vehicle or meeting space. The unused location can be an unused vehicle or meeting space, such as a conference room.

Figure 2:
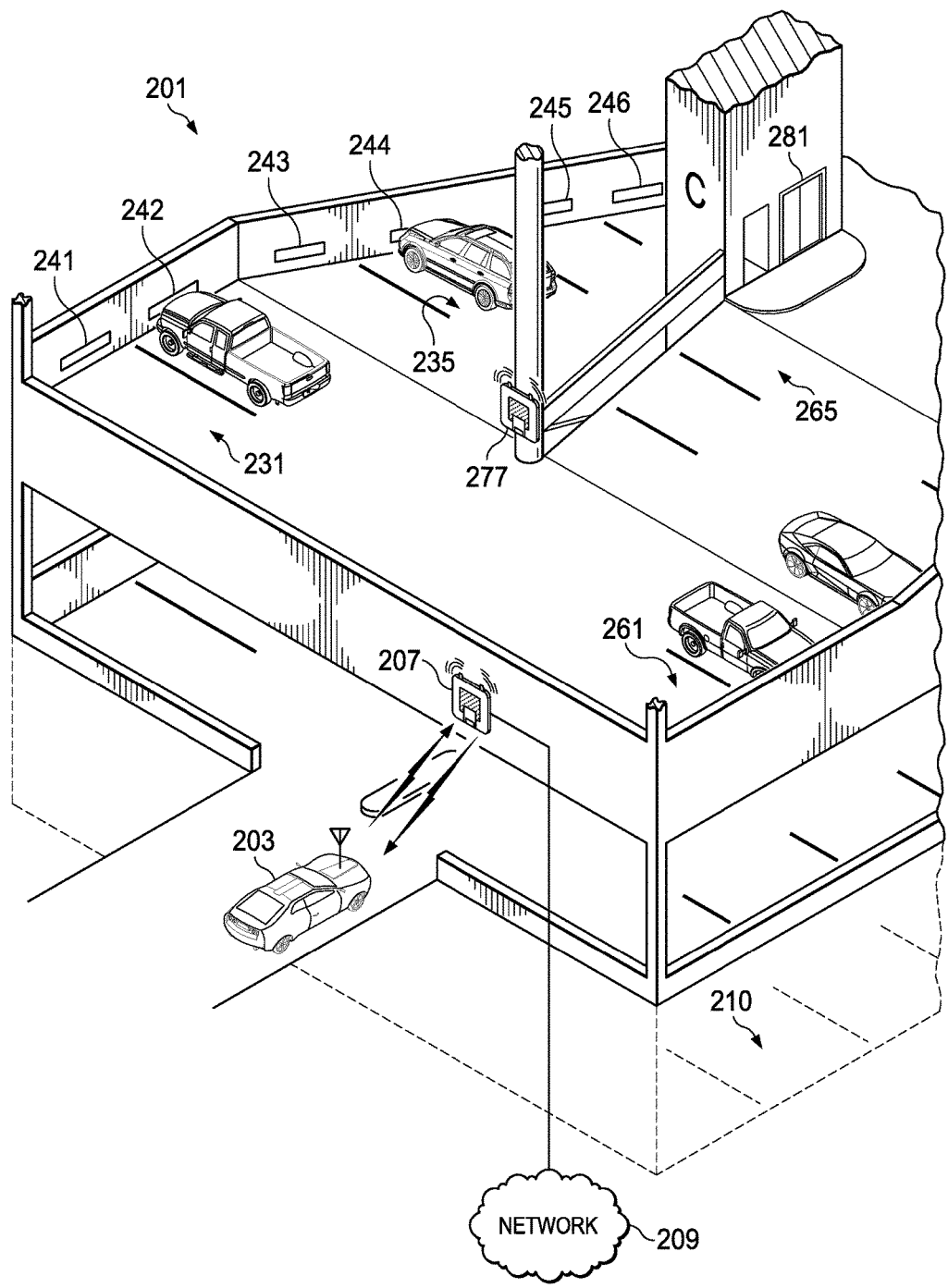
FIG. 2 is a diagram of a parking structure in accordance with an embodiment of the invention.

FIG. 2 is a diagram of a parking structure in accordance with an embodiment of the invention. A car driven by a user, who has access to a mobile device, may approach the parking structure. Car 203 provides a data processing system such as data processing system 100 of FIG. 1, above. The data processing system may be embedded to the vehicle and may present data to a dashboard-mounted display. Alternatively, the data processing system may be in the form of a smart phone or other mobile device. If in the form of a embedded data processing system, the data processing system is considered to be a mobile device as well. Such an embedded data processing system can include, for example, a built-in device for a vehicle dashboard.

Figures 3, 6:
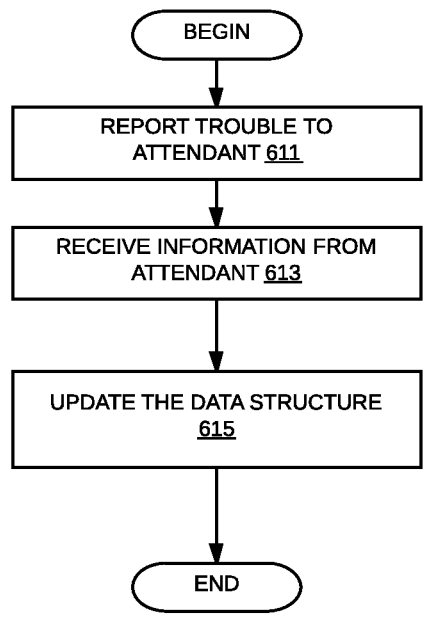
FIG. 3 is a data structure that relates each parking space to one or more features and provides distance information in relation to the access points in accordance with an embodiment of the invention.
FIG. 6 is a flowchart of steps performed by the access point to collect information from a parking lot attendant to reset or override any reported problem associated with a parking space in accordance with an embodiment of the invention.

Near an entrance to parking structure 201, an access point may interact with the car 203, and specifically, the data processing system within the car, as operated by the user. Access point 207 may also be arranged with the parts and functionality of data processing system 100, of FIG. 1. Both access point 207 and car 203 provide localized wireless data transfer using near field communications (NFC) protocols such as described by the Bluetooth™ standard or NFC Forum. Access point 207, as well as other access points, may record status information to a data structure, as depicted at FIG. 3, that is shared amongst all access points that serve the parking structure 201. Alternatively, access points may merely be nodes in a network that coordinate to a server that hosts the data structure and otherwise communicates to the data sensors to serve and collect information concerning the plural spaces via the access points. As a further alternative, one of the access points, may, itself, operate as a server. Accordingly, the term "access point" and "server" may be used interchangeably, herein. For purposes of at least one embodiment, the server responds to indications from location sensors, explained below, and coordinates the operation of plural access points to provide parking guidance. The server can be configured as a data processing system, such as data processing system 100 of FIG. 1, above.

Access point 207 may interconnect to network 209 to collect data from, for example, location sensors 241-246 established to report a status for each parking spot. A location sensor is a sensor that can detect, with some margin for error, whether at least one parking spot is occupied. A location sensor may come in several forms, for example, motion detectors, pressure sensors, induction loops or any other detecting mechanism that can detect the presence of a substantial vehicle. Each such location sensor technology has its limitations. Thus, smaller vehicles may be below a location sensor's threshold of detection. Such smaller vehicles could include a motorcycle. Further, each such location sensor may not detect a vehicle unless it is squarely within the confines of a parking space, as defined by painted stripes or other parking indications. As such, the collective occupancy of such spaces, by such location sensors, may, in effect, be a first draft description of a status of the parking spaces as a whole. Such a first draft description can be modified by human-entered reports that clarify any problems that contradict or otherwise modify the availability of spaces reported by the location sensors. Location sensors may interconnect (not shown) to network 209 to facilitate collection and distribution to access points 207 and 277. Further, although not pictured in FIG. 2, it is appreciated that all parking spaces would have a parking sensor that relays information to the plural access points or server for the parking structure. Such information can include an indication that a space is occupied, that a space is unoccupied, or that a space is in an indeterminate state.

Parking structure 201 may provide additional access points periodically throughout the structure. As such, a user may reconnect to second access point 277 on a second and other levels of the structure. Parking structure 201 may be of a design which permits drivers to ascend as they drive a generally counter-clockwise pattern. Accordingly, parking space 235 is below parking space 231, which in turn is below parking spaces 261-265. Similarly, the spaces are accessible to car 203 in the order with which the car would naturally traverse the parking structure 201.

Thus, car 203 would pass each space in order from parking space 235 to parking space 231 to parking space 261 and then parking space 265 as the car makes its first ascent through the parking structure. Although parking space 261 is linearly closer to access point 207, parking space 231, which is farther by a direct line to access point 207, is actually nearer according to a driving distance the driver would cover as the driver navigates the parking structure across the drivable surfaces. For parking structures that provide plural routes to reach a space by driving, driving distance is determined by a most direct route with reference to the applicable access point that operates as a starting point on the route. Accordingly, the driving distance between a mobile device and an unused space can be, for example, ten times the distance than a normal straight-line distance would be. Specifically, unused space 210 can be 25 feet distant from a mobile device to the point on the pavement that cars drive through to enter and leave unused space 210, also known as its threshold. However, to drive to that space, the driver would need to drive the car 203 a substantial distance, over 200 feet to spiral down a downward sloping garage floor to eventually arrive at the unused space's threshold, and descend a full level in the process. In contrast, the driver of car 203 would drive an ascending spiral less than a full level to arrive to a parking space in front of sensor 245. Clearly, the space in front of sensor 245 has a substantial lateral distance that makes the straight-line distance from car 203 to space in front of sensor 245 substantially larger than the straight-line distance from car 203 to space 210. Nevertheless, the driving distance is shorter to the space in front of sensor 245 than to space 210, given, that each level is co-extensive area covering a roughly spirally arranged parking garage level.

Although many garages may be linearly driven, parking structure 201 immediately provides the driver a choice to either drive forward and generally climb through the structure counter-clockwise or, to turn left, and descend to the subsurface level(s) by driving clockwise. As such, a final space if the driver descends into the structure, might be parking space 210.

Parking structure 201 may provide parking spaces of different qualities—for which the operator of the parking structure can associate to each parking space in a data structure, as explained further in FIG. 3, below. Some features that a parking space may be linked to or otherwise associated to may include, for example, wide or large space; near an elevator; near a staircase; above a surface grade; having a roof; and the like. As may be appreciated, an operator to a garage may establish such associations based on a reasonableness standard, which might be, in the example of "having a roof", expressed as, "does the roof shelter at least half of the parking space?" As such, the association can be a subjective assessment by the operator of the garage to apply whatever standard of reasonableness that the operator wants to employ. Similarly, a standard or feature of "near an elevator" may depend on an operator's interpretation of whether the parking space is near a front door of an elevator or any part of an elevator shaft, such as elevator 281. Such a criteria may measure distances such as a radius from some feature of the elevator. An elevator feature can include the center of a single elevator; a corner to an elevator shaft; or a doorway to an elevator, among others. Despite the vagaries of associating a feature to a parking space in a data structure, the one or more embodiments of the invention may reference the data structure to provide a user/motorist some qualitative selection of the preferred parking desired.

The illustrative embodiments permit a motorist or user to obtain a list of parking spaces arranged by nearest driving distance (or merely distance) to give a driver an opportunity to avoid any fruitless detours to locate spaces that are either entirely occupied, on a parking level, or are unused, but not of the preferred kind that the user desires. To date, no one has given the user options to specify preferences other than location. Further, illustrative embodiments can permit collective action of the users of such a parking structure, to report observed difficulties or problems associated with one or more spaces that, though automatically sensed as unused, are actually unusable for a variety of reasons.

FIG. 3 is a data structure that relates each parking space to one or more features and provides distance information in relation to the access points in accordance with an embodiment of the invention. The data structure may provide a key such as a label to a parking space, which may be a unique identifier for the space that matches markings on or around the parking space. For example, parking space 231 of FIG. 2 may be physically marked with a number "31" (not shown) on pavement behind the parking space, while on a nearby wall or sign, a conspicuous "C" might be present to indicate a floor or section that further defines the parking space as "C31". Accordingly, the static features of a parking space may be described on a row associated with the label of the parking space in data structure 300. Columns thus can comprise, parking space 301, unused 302, problem 303, large 304, close to an elevator 305, above ground 307, roof covers 308, as well as distance information 309. Distance information may be a collection of sub-fields that provide a distance, in terms of driving distance, between the parking space and each of the access points in the parking structure, such as parking structure 201 of FIG. 1, above. For example, parking space 261 of FIG. 2, above, may be identified as level C, row 1, space 31. These features are not exhaustive, and are merely considered exemplary.

Static features may be indicated by simple binary symbols, depicted as "yes" or "no". However, in the data processing system, such information may be stored in as little as a single bit of information as a logical one or a logical zero. These binary features can be reported within columns such as large, close to an elevator, above ground, and has a roof, within data structure 300.

Regarding the "problem" feature, shown in column 303, one of several states may be present to symbolize the nature of the problem. A problem is a user-reported difficulty with accepting a space as suitable to park within. As such, a problem is a subjective description that may vary from user to user, and may relate, in part, to the type of vehicle used by the user. At the most elementary level, a problem may be simply an indication that the space is unusable, without a specific given reason. Nevertheless, in the embodiment presented in FIG. 3, the problem is described with details that might be useful to a parking lot attendant to resolve the problem. Problems that can be reported can include, "debris in the space", "spill in the space", "neighboring vehicle encroachment", and "adjacent cars leave too narrow a space". One or more of these conditions may be stored, symbolically, to the field associated with the parking space. An assessment of "debris in a space", can be an indication that at least one non-vehicle object is present in the parking space. Similarly, "neighboring vehicle encroachment" can indicate that a vehicle marginally occupies an edge portion of a neighboring unused space. Such a condition can make it difficult to park a car in the unused space and still have room to open one or more doors to the car. More aggressive encroachment can make it entirely impossible for any car to park in the adjacent nominally unused space. To the extent a vehicle parks in two spaces, the space that a parking sensor fails to detect the vehicle presence is considered the unused space. Further, as a general category, the unused space can become unusable, if the unused space has an unacceptable condition on, under, or within it. An unacceptable condition can be any condition that is annoying or vexes a user, for example, that the parking space slopes to one side, and the driver has particularly weak arms for coordinating door openings for ingress and egress from the vehicle. An unacceptable condition can be a dangerous condition. A dangerous condition can be, for example, an exposed pothole at the opening of the space; discontinuous pavement; people or animals congregating within or nearby the parking space; presence of construction or destruction activity in or near the space; insufficient lighting for the space, among many others. An unacceptable condition may be a situation where the space is not yet dangerous, but may become so in the future, as can occur when liquid is present in the space, and temperatures are expected to drop below freezing.

The "unused" column 302 may be periodically refreshed by a sensor network which is polled or otherwise detected by a data processing system. The sensor network can include, for example, location sensors 241-246, of FIG. 2, above. The "location/distance" column 309, can include data concerning a space's level and coordinates in such a manner that one or more driving distances from the access points is available, or otherwise suitable to be calculated. The distance information may be used to prioritize or otherwise order each parking space when multiple parking spaces satisfy a criteria that specifies one or more static features. As such, a distance from a space, as necessary for driving, between an access point and the space, can be calculated or otherwise predetermined. By reference to the identity of an access point to which a user interacts, the access point may establish the distance to each of the plural spaces recorded in data structure 300. As such, any determination of distance to parking spaces may be made without reference to Global Positioning Satellite (GPS) radio signals.

Figure 4:
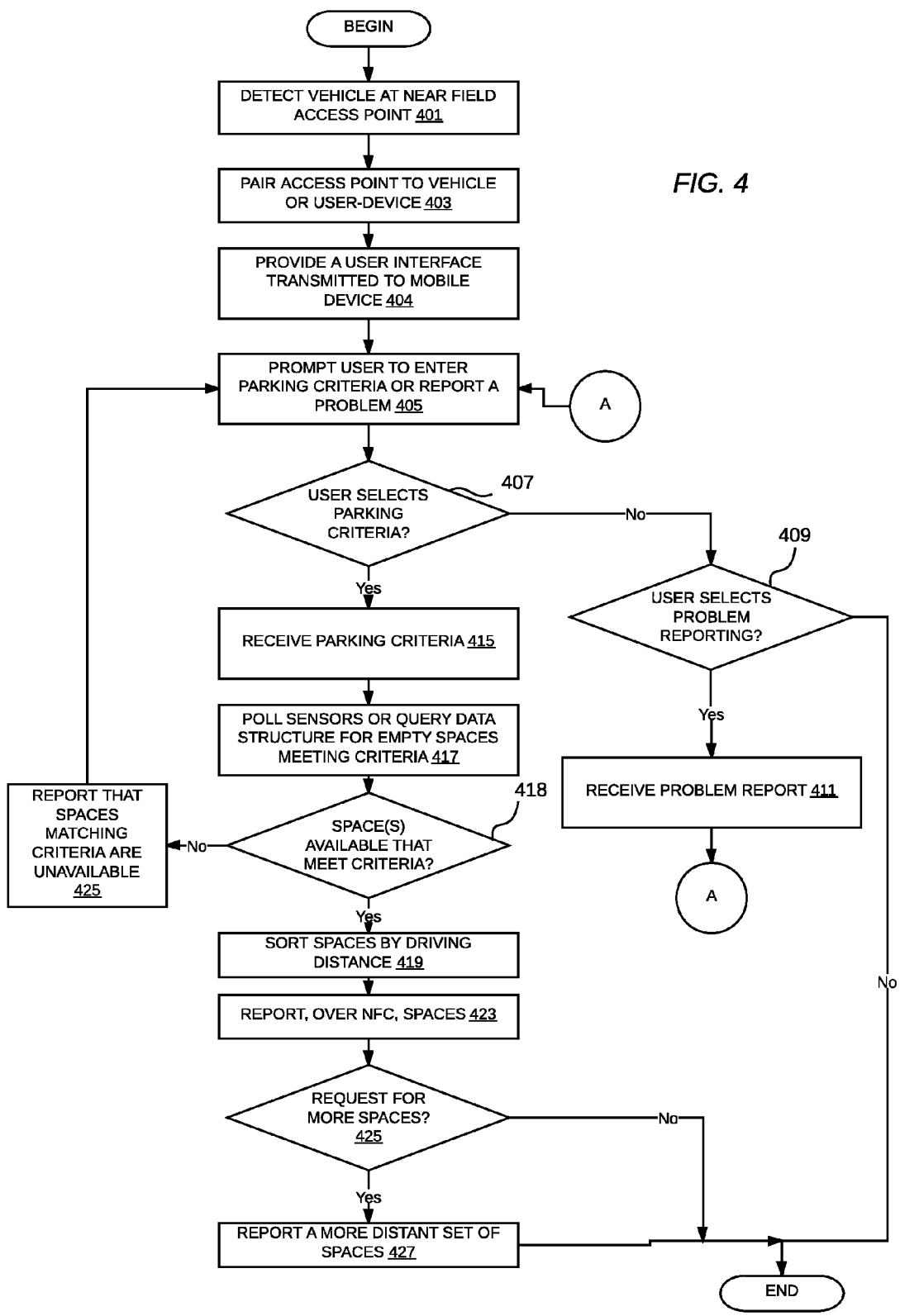
FIG. 4 is a flowchart of actions performed at an access point to supply a user with details concerning availability of parking spaces, or collect from the user details concerning problems with parking spaces in accordance with an embodiment of the invention.

FIG. 4 is a flowchart of actions performed at an access point to supply a user with details concerning availability of parking spaces, or collect from the user details concerning problems with parking spaces. The access point can be, for example, access point 207 or access point 277 of FIG. 2, above. Initially, the access point may detect a car at access point (step 401). The car can be any vehicle, and detection may be merely receiving a near field communication handshake to a mobile device embedded in the vehicle, or present on the person of a user. Next, the access point may pair with the mobile device (step 403). Pairing may include the user accepting an indication from the access point that pairing has begun, or may be passive, based on previously indicated preferences of the user to always pair with the access point without inquiry.

It is appreciated that "pairing" is a form of radio handshake. A radio handshake is an exchange of signaling information that may be driven by the access point assigning to the mobile device frequencies, power levels, frequency hopping patterns, chip codes, and the like, as well as setting and/or revising data rates to account for radio interference. A detection of the radio handshake can be the receipt of a confirmation signal from the mobile device, that it is able to comply with instructions how to set its radio. A radio handshake can, alternatively, be driven by the mobile device instructing the access point to adopt signaling features just mentioned.

Next, the access point may provide a user interface transmitted to the mobile device in response to pairing (step 404). The user interface may be a set of instructions, in a language of the user, for interacting with the access point, such as shown in any one of FIGS. 5A-5B, below. As such, the use interface may provide prompts to be navigated via keyboard, pointer or voice, for example, as provided or simulated at the user's mobile device. Further, the user interface may be entirely provided in an audio format, which is then rendered from the mobile device to the user through a speaker. In any event, the user interface, as received at the mobile device, is rendered to the user in a convenient manner which may minimize the time the user may spend with his car opened to access a kiosk or other mechanism to take user-inputs outside of the car. Further, the user interface permits collection of information and criteria from the user as depicted further in steps 407, 415, 409 and 411. As such, mobile device, in executing the user interface, operates as a proxy for the access point, and relays information received at the mobile device over the radio link established by the radio handshake.

Next, the access point, using the mobile device as a proxy, may prompt the user to enter parking criteria or report a problem (step 405). The access point may then determine whether the user selects to enter a parking criteria (step 407).

In response to a positive result at step 407, access point may receive parking criteria (step 415). Next, the access point may poll sensors or query a data structure for empty spaces meeting the criteria (step 415). Next, the access point may determine if any spaces are available that meet the criteria (step 418). If no spaces are available, access point may report that spaces matching the criteria are unavailable (step 425). The report may simply be dispatched to the mobile device for the mobile device to display, as a proxy for the access point. Processing may resume, thereafter, to iterate over step 405 and permit the user to enter further criteria using steps 415 and 417.

However, if spaces are available that meet the criteria, after step 418, processing continues where the access point sorts spaces by driving distance (step 419). Naturally, the access point may exclude all spaces that fail to meet the criteria. Additionally, the access point may eliminate spaces that are recorded as unavailable, at least as stored and maintained in data structure 300. For further details concerning updates to data structure 300, see FIG. 6, below. After sorting the unused spaces that meet the criteria, the access point may present a predetermined number of the nearest of such spaces by reporting, over near field communications (step 423). Since the processing of the flowchart of FIG. 4 can be conducted by a centralized server, the server may rely on identity and/or location information of the access point in order to provide lists of, and sorting of, the unused spaces relative to the position of the access point. Accordingly, a subsequent query for unused spaces, at a second access point remote from an initial access point, may result in substantially different listings of unused spaces. In other words, the location of the access point may be used as a proxy for the location of the vehicle.

The user may prefer a larger number of such spaces. Accordingly, the access point may detect a request for more spaces (step 425). If so, the access point may report a successively more distant set of spaces (step 427). As such, the step 427 reporting is of spaces such that the nearest among such spaces is farther than the farthest space reported at step 423. The displays presented at steps 423 and 427 may persist, or otherwise be locally stored to the mobile device, even if the user drives beyond the radio range of the access point. Accordingly, the referenced parking locations may be visible during navigating the parking structure.

A user, at step 407 may opt to provide details other than selecting parking criteria. If so, the access point determines whether the user selects problem reporting (step 409). If the user selects problem reporting, the access point may receive the problem report (step 411). The access point may receive the problem report via information transmitted from the mobile device using near field communication with the access point. Next, the access point may repeat prompting the user to enter parking criteria or report a problem at step 405.

Reporting and/or receiving a problem report can include receiving from the user an identifier of the parking space, for example, obtaining a section, level and/or space serial number. Further, the user may select, from a set of options, the description of the problem, consistent with the symbolic storage of the data structure, described above with respect to FIG. 3. Accordingly, the user may enter such problems as "debris in the space", "spill in the space", "neighboring vehicle encroachment", or "adjacent cars leave too narrow a space" among others. The reporting and/or updating of the data structure may prompt follow-up actions in a separate flowchart, for example, as described at FIG. 6, below, operated, for example, by a parking attendant. It is appreciated that input validation may occur to confirm that the user-entered parking space has a corresponding entry in the data structure. Any spaces described by the user, but found to not be present in the data structure, may cause error reporting to the user, and a request for the user to re-enter the information. Although the steps in FIG. 6 are explained as being performed by an access point, it is appreciated that the actual performing of the steps may be coordinated with a server, such that the server performs the steps, and uses the access point as a communication port with which to communicate with the user's mobile device.

Figure 5A:
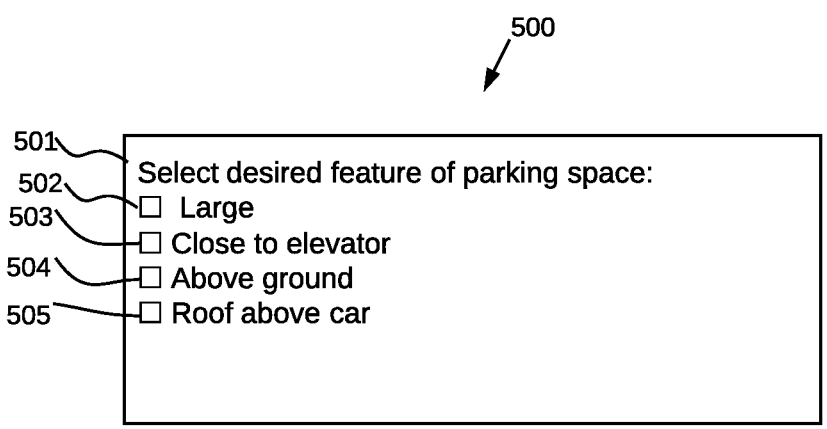
FIG. 5A is a user interface showing options that may be presented to a user to access parking criteria in accordance with an embodiment of the invention.

FIG. 5A is a user interface showing options that may be presented to a user to access parking criteria in accordance with an embodiment of the invention. The user interface is described in data transmitted from the access point to the mobile device. The mobile device, by virtue of its data processing system, may render the user interface to the user in a manner to receive the user's inputs. Accordingly, user interface 500 may provide visual prompts for user input. The query can be prefaced with "select desired feature of parking space:" 501. Further, the user interface can provide check boxes to receive user selection of "large" 502, "close to elevator" 503, "above ground" 504, and "roof above car" 505, which may roughly correspond to, within data structure 300 of FIG. 3, data structure fields 304, 305, 307 and 308, respectively. Accordingly, in response to receiving such user-criteria, the access point may filter the data structure for all "Y" or "yes" entries that signal that the specified parking space satisfies the criteria requested.

Figure 5B:
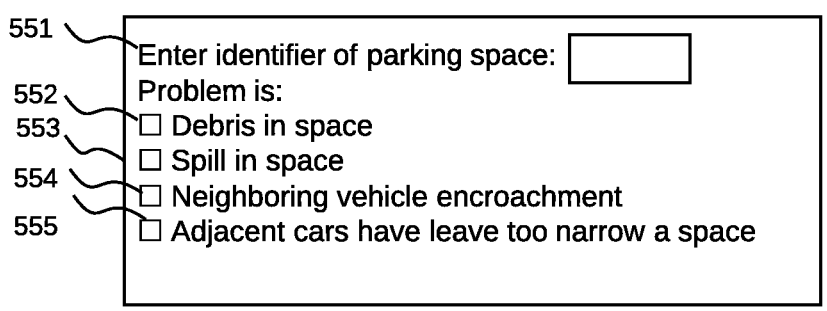
FIG. 5B is a user interface showing options that may be presented to a user to collect problem information concerning a parking space in accordance with an embodiment of the invention.

FIG. 5B is a user interface showing options that may be presented to a user to collect problem information concerning a parking space in accordance with an embodiment of the invention. User interface 550, initially may ask the user to specify the parking space identifier 551. The parking space identifier may be the combination of level and serial number appearing on signage near the space. Further, the user interface may permit the user to select options for subjective user assessments of the space among, for example, "debris in space" 552, "spill in space" 553, "neighboring vehicle encroachment" 554, and "adjacent cars leave too narrow a space" 555.

FIG. 6 is a flowchart of steps that may be performed by the access point to collect information from a parking lot attendant to reset or override any reported problem associated with a parking space. Initially, the access point may report trouble to the attendant (step 601). The report may be made further in response to step 411 in FIG. 4, above. The report may be made by any one of several means, for example, by audible alert or visual signage within the parking structure in a place audible or otherwise perceptible to the parking attendant in a location the parking attendant is expected to be. Next, the access point may receive information concerning one or more parking spaces identified or otherwise reported to the attendant in step 601 (step 613). Such information can include a label for the parking space, and a further information that the condition described as a problem in step 411 of FIG. 4 has been resolved. As such, the access point may update the data structure (step 415) to reset any problem field with a symbolic "no" that indicates the absence of any problem. Processing may terminate thereafter. Accordingly, further reports of spaces that are available can be influenced to generate subsequent "yes" branches at step 418 when the applicable parking space is found to meet the criteria of the user In contrast, a problem parking space can resolve, spontaneously, due to behaviors of motorists or other passers-by, who take matters into their own hands by, for example, removing their cars from conflicting parking spaces. As such, a subsequent driver may park in a space that is open, but otherwise marked with the symbolic "yes" indicative of a problem, or, alternatively, the description of the problem (see FIG. 3 column 303). As such, the corresponding location sensor for the parking space may signal to the server that the space is now occupied. As such, the server can replace the "yes" with a "no" or "N" in column 303 of data structure 300 in FIG. 3.

Accordingly, one or more embodiments of the invention provide a means to automatically collect information concerning the occupancy of the plural spaces in a structure. Further, user-criteria may permit filtering of spaces to satisfy the requirements of a user. Additionally, problems that are undetected by the sensors, may be reported with respect to a parking space, so that such a parking space is taken out of circulation, for purposes of reporting availability of spaces to later users. Finally, a parking attendant may reset availability of spaces formerly reported as associated with a problem, thus returning the space into circulation.

It is to be appreciated that the features associated to a parking space, herein, are merely exemplary, and can be extended to whatever feature is desirable or necessary for specific vehicles. Further features can include whether a space is a handicapped parking space, or whether a vehicle battery recharging system is accessible to the vehicle in the parking space. Further, that in place of radio handshakes and radio protocols, a more general wireless handshake or wireless protocol can be used. Such wireless protocols can include, for example, optical, infrared and audible signals. In any event, a wireless session is established once the mobile device establishes a wireless handshake to the access point. The wireless session persists until either, a) the mobile device is outside an effective radio range with the access device, or is otherwise unable to communicate with the access point; or b) the mobile device performs a subsequent wireless handshake to a second access point.

The present invention may be a system, a method, and/or a computer program product. The computer program product may include a computer readable storage medium (or media) having computer readable program instructions thereon for causing a processor to carry out aspects of the present invention.

The computer readable storage device can be a tangible device that can retain and store instructions for use by an instruction execution device. The computer readable storage device may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage device includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage device or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage device within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for matching a user to unused locations in a structure, the method comprising:
   providing a user interface to a mobile device of the user for finding an unused space, among a plurality of spaces, according to a user-selected criteria, wherein the user interface is transmitted via a wireless protocol agreed during a wireless handshake; and
   in response, first presenting the mobile device with first unused spaces meeting the user-selected selection criteria;
   presenting to the mobile device a list of at least two problem types for selection by the user;
   receiving from the mobile device, a selection among the at least two problem types that specifies the at least one of the unused spaces, thereby forming a problem space, and in response, second presenting a second at least one unused space to the mobile device without the problem space, wherein the second unused spaces are presented in order of shortest distance to longest distance to a current user location, and subsequently presenting a second mobile device with unused spaces that exclude at least the problem space, wherein the order of shortest distance to longest distance to the current user location is an order according to a driving distance from a location of an access point to each respective unused space, wherein the access point is an access point among plural access points affixed to the structure, the access point having a wireless session with the mobile device.

2. The method of claim 1, wherein presenting the mobile device with first unused spaces meeting the user-selected criteria further comprise receiving an indication from a location sensor corresponding to each space, among the plurality of spaces, such that the unused spaces at least have a corresponding indication of being unoccupied from their respective location sensor but lack a corresponding human-generated problem report, and wherein the unused spaces are parking spaces.

3. The method of claim 1, wherein the at least two problem types comprises a vehicle parked too close to the problem space and another problem that creates an unacceptable condition.

4. The method of claim 1, wherein the user-selected criteria is at least one selected from the group consisting of a shortest distance to an elevator shaft and unused space meeting a size requirement.

5. The method of claim 1, further comprising:
   detecting a presence of the user at an entrance to a structure containing unused spaces, and in response, detecting the wireless handshake to the mobile device of the user, wherein the step of providing the user interface occurs in response to the detecting, and further, wherein first presenting the mobile device with first unused spaces is in response to receiving from the mobile device the user-selected criteria.

6. A method for matching a user to unused locations in a structure, the method comprising:
   providing a user interface to a mobile device of the user for finding an unused space, among a plurality of spaces, according to a user-selected criteria, wherein the user interface is transmitted via a wireless protocol agreed during a wireless handshake; and
   in response, first presenting the mobile device with first unused spaces meeting the user-selected selection criteria
   in an order of increasing driving distance for each first unused space from an access point, wherein the access point is a source for the user interface in the step of providing the user interface to the mobile device, and the access point is affixed to the structure;
   presenting to the mobile device a list of at least two problem types for selection by the user;
   receiving from the mobile device, a selection among the at least two problem types that specifies the at least one of the unused spaces, thereby forming a problem space, and in response, second presenting a second at least one unused space to the mobile device without the problem space, wherein the second unused spaces are presented in order of shortest distance to longest distance to a current user location, and subsequently presenting a second mobile device with unused spaces that exclude at least the problem space.

7. A computer program product for matching a user to unused locations in a structure, the computer program product comprising: a computer readable storage device having computer readable program code stored thereon, the computer readable program code comprising:
   computer readable program code configured to provide a user interface to a mobile device of the user for finding an unused space, among a plurality of spaces, according to a user-selected criteria, wherein the user interface is transmitted via a wireless protocol agreed during a wireless handshake; and in response, first present the mobile device with first unused spaces meeting the user-selected criteria;
   computer readable program code configured to present to the mobile device a list of at least two problem types for selection by the user;
   computer readable program code configured to receive from the mobile device, a selection among the at least two problem types that specifies the at least one of the unused spaces, thereby forming a problem space, and in response, second present a second at least one unused space to the mobile device without the problem space, wherein the second unused spaces are presented in order of shortest distance to longest distance to a current user location, and subsequently present a second mobile device with unused spaces that exclude at least the problem space, wherein the order of shortest distance to longest distance to a current user location is an order according to a driving distance from an access point location to each respective unused space, wherein the access point is an access point among plural access points affixed to the structure, the access point having a wireless session with the mobile device, and wherein at least one unused parking space that is straight-line nearer to the mobile device is presented after a second unused parking space despite the second unused parking space being straight-line farther to the mobile device.

8. The computer program product of claim 7, wherein computer readable program code configured to first present the mobile device with first unused spaces meeting the selection criteria further comprises computer readable program code configured to receive an indication from a location sensor corresponding to each space, among the plurality of spaces, such that the unused spaces at least have a corresponding indication of being unoccupied from their respective location sensor but lack a corresponding human-generated problem report, and wherein the unused spaces are parking spaces.

9. The computer program product of claim 7, wherein the at least two problem types comprises a vehicle parked too close to the problem space and another problem that creates an unacceptable condition.

10. The computer program product of claim 7, wherein the user-selected criteria is at least one selected from the group consisting of a shortest distance to an elevator shaft and unused space meeting a size requirement.

11. The computer program product of claim 7, further comprising:
computer readable program code configured to detect a presence of the user at an entrance to a structure containing unused spaces, wherein the structure has at least two levels, and in response, detect the wireless handshake to the mobile device of the user, wherein the computer readable program code configured to provide the user interface occurs in response to the computer readable program code configured to detect, and further, wherein first presenting the mobile device with first unused spaces is in response to receiving from the mobile device the user-selected criteria.

12. A computer program product for matching a user to unused locations in a structure, the computer program product comprising: a computer readable storage device having computer readable program code stored thereon, the computer readable program code comprising:
computer readable program code configured to provide a user interface to a mobile device of the user for finding an unused space, among a plurality of spaces, according to a user-selected criteria, wherein the user interface is transmitted via a wireless protocol agreed during a wireless handshake; and in response, first present the mobile device with first unused spaces meeting the user-selected selection criteria in an order of increasing driving distance for each first unused space from an access point, wherein the access point is affixed to the structure, and wherein an access point is a source for the user interface;
computer readable program code configured to present to the mobile device a list of at least two problem types for selection by the user;
computer readable program code configured to receive from the mobile device, a selection among the at least two problem types that specifies the at least one of the unused spaces, thereby forming a problem space, and in response, second present a second at least one unused space to the mobile device without the problem space, wherein the second unused spaces are presented in order of shortest distance to longest distance to a current user location, and subsequently present a second mobile device with unused spaces that exclude at least the problem space.

13. A data processing system comprising:
a bus;
a computer readable tangible storage device connected to the bus, wherein computer usable code is located in the computer readable tangible storage device;
a communication unit connected to the bus; and
a processing unit connected to the bus, wherein the processing unit executes the computer usable code to match a user to unused locations in a structure, wherein the processing unit executes the computer usable program code to provide a user interface, within a first session with a first access point, to a mobile device of the user for finding an unused space, among a plurality of spaces, according to a first user-selected criteria and in an order according to a driving distance from an access point location to each respective unused space, wherein the access point is an access point among plural access points affixed to the structure, the access point having a wireless session with the mobile device, and wherein a first unused space is reported before a straight-line closer second unused space, wherein the second unused space is present on a different level of a parking structure as is a current level of the mobile device, wherein the user interface is transmitted via a wireless protocol agreed during a first wireless handshake; and in response, first present the mobile device with first unused spaces meeting the first user-selected criteria; present to the mobile device a list of at least two problem types for selection by the user; receive from the mobile device, a selection among the at least two problem types that specifies the at least one of the unused spaces, thereby forming a problem space; and provide the user interface, within a second session with a second access point, to the mobile device, wherein the user interface is transmitted in response to receiving from the mobile device the selection; and in response, second present the mobile device with second unused spaces meeting a second user-selected criteria.

14. The data processing system of claim 13, wherein computer usable program code configured to first present the mobile device with first unused spaces meeting the first user-selected criteria further comprises computer usable code configured to receive an indication from a location sensor corresponding to each space, among the plurality of spaces, such that the unused spaces at least have a corresponding indication of being unoccupied from their respective location sensor but lack a corresponding human-generated problem report, and wherein the unused spaces are parking spaces.

15. The data processing system of claim 13, wherein the at least two problem types comprises of a vehicle parked too close to the problem space and another problem that creates an unacceptable condition.

16. The data processing system of claim 13, wherein the first user-selected criteria is at least one selected from the group consisting of a shortest distance to an elevator shaft and unused space meeting a size requirement.

17. The data processing system of claim 13, wherein the processing unit further executes computer usable code to detect a presence of the user at an entrance to a structure containing unused spaces, wherein the structure has at least two levels, and in response, detect the first wireless handshake to the mobile device of the user, wherein in executing computer usable code configured to provide the user interface, the processing unit further executes computer usable code to provide the user interface in response to the computer usable code configured to detect, and
further, wherein first presenting the mobile device with first unused spaces is in response to receiving from the mobile device the first user-selected criteria.

* * * * *